(12) United States Patent
Bassali et al.

(10) Patent No.: US 8,856,823 B2
(45) Date of Patent: Oct. 7, 2014

(54) METHODS AND SYSTEMS FOR SYNCHRONIZING DELIVERY OF MEDIA CONTENT STREAMS HAVING DIFFERENT RESOLUTIONS

(75) Inventors: Harpal S. Bassali, San Francisco, CA (US); Armando P. Stettner, Westford, MA (US); Michael P. Ruffini, Methuen, MA (US); Marcelo D. Lechner, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 730 days.

(21) Appl. No.: 12/751,893

(22) Filed: Mar. 31, 2010

(65) Prior Publication Data

US 2011/0209175 A1     Aug. 25, 2011

Related U.S. Application Data

(60) Provisional application No. 61/307,812, filed on Feb. 24, 2010.

(51) Int. Cl.
    *H04N 7/10*      (2006.01)
    *H04N 21/2343*   (2011.01)
    *H04N 21/63*     (2011.01)
    *H04N 21/81*     (2011.01)
    *H04N 21/242*    (2011.01)
    *H04N 21/234*    (2011.01)
    *H04N 21/6332*   (2011.01)

(52) U.S. Cl.
    CPC ....... *H04N 21/23439* (2013.01); *H04N 21/631* (2013.01); *H04N 21/812* (2013.01); *H04N 21/242* (2013.01); *H04N 21/23424* (2013.01); *H04N 21/6332* (2013.01)
    USPC ............................................. 725/32; 725/94

(58) Field of Classification Search
    CPC .................................................... H04N 21/262
    USPC ...................................................... 725/32, 94
    See application file for complete search history.

(56) References Cited

U.S. PATENT DOCUMENTS

| | | | |
|---|---|---|---|
| 2006/0053455 A1* | 3/2006 | Mani et al. | 725/87 |
| 2007/0233571 A1* | 10/2007 | Eldering et al. | 705/14 |
| 2008/0297652 A1* | 12/2008 | Buttle et al. | 348/441 |
| 2009/0210900 A1* | 8/2009 | Kaftan | 725/34 |
| 2010/0269128 A1* | 10/2010 | Gordon | 725/25 |
| 2010/0269138 A1* | 10/2010 | Krikorian et al. | 725/39 |
| 2011/0067080 A1* | 3/2011 | Riha | 725/110 |
| 2011/0119704 A1* | 5/2011 | Aaltonen | 725/34 |
| 2012/0023522 A1* | 1/2012 | Anderson et al. | 725/35 |
| 2013/0101272 A1* | 4/2013 | Plotnick et al. | 386/249 |

* cited by examiner

*Primary Examiner* — Junior Mendoza

(57) ABSTRACT

An exemplary method includes processing a first program stream representative of media content having a first resolution and a second program stream representative of the media content having a second resolution, generating a single advertisement stream representative of advertisement content having a third resolution, detecting a transmission lag between the first and second program streams, dynamically synchronizing the first and second program streams to substantially remove the detected transmission lag, transmitting the synchronized first program stream by way of a first content channel, the synchronized second program stream by way of a second content channel, and the advertisement stream by way of an advertisement channel, and directing a media content access device to switch from being tuned to the second content channel to being tuned to the advertisement channel during an advertising break in the media content. Corresponding methods and systems are also disclosed.

21 Claims, 12 Drawing Sheets

METHODS AND SYSTEMS FOR SYNCHRONIZING DELIVERY OF MEDIA CONTENT STREAMS HAVING DIFFERENT RESOLUTIONS

RELATED APPLICATIONS

The present application claims priority under 35 U.S.C. §119(e) to U.S. Provisional Patent Application No. 61/307,812 by Harpal S. Bassali et al., filed on Feb. 24, 2010, and entitled "Methods and Systems for Synchronizing Delivery of Media Content Streams Having Different Resolutions," the contents of which are hereby incorporated by reference in their entirety.

BACKGROUND INFORMATION

The advent of set-top box devices ("STBs") and other media content access devices ("access devices") has provided users with access to a large number and variety of media content choices. For example, a user may choose to experience a variety of broadcast television programs, pay-per-view services, video-on-demand programming, Internet services, and audio programming via a set-top box device.

Such access devices have also provided media content providers with an ability to present targeted advertising to specific users or groups of users. For example, designated advertisement channels may be used to deliver various targeted advertisements to an access device. An access device associated with a particular user may be directed by a head-end unit of a television service network to switch from being tuned to a content channel carrying a media content program to being tuned to one of the advertisement channels during an advertisement break in order to present advertisement content carried by the advertisement channel to the user. After the advertisement content has been presented, the access device may tune back to the content channel.

However, a mismatch in resolution between media content carried on a content channel and an advertisement channel to which an access device tunes may cause undesirable transition delays on some display devices (e.g., televisions) when the access device switches between the two channels. This limitation of display devices forces a content provider to maintain separate advertisement channels for each possible resolution (e.g., standard definition ("SD") and high definition ("HD")). Such is the case even when an SD channel and an HD channel (e.g., ESPN and ESPN HD) carry different resolutions of the same media content. This is because the transmission path of the HD content stream and the SD content stream can be different within a video network. In addition, the SD content may be derived from the HD content, thereby introducing lag time between the two content streams.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
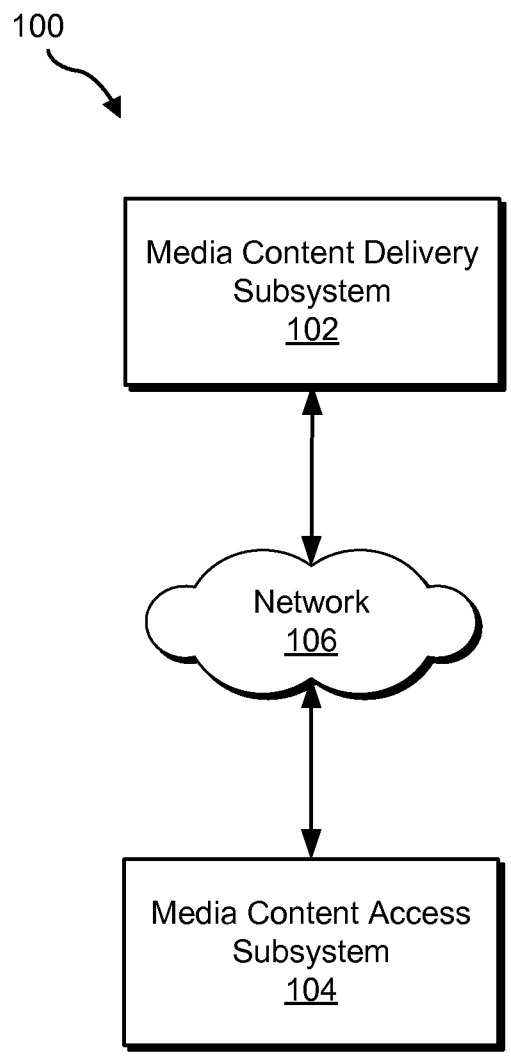
FIG. 1 illustrates an exemplary media content delivery system according to principles described herein.

Methods and systems for synchronizing delivery of media content streams having different resolutions are described herein. As described in more detail below, a media content delivery subsystem (e.g., a head-end unit of a television service network) may be configured to process a first program stream representative of media content having a first resolution (e.g., an SD resolution) and a second program stream representative of the same media content in a second resolution (e.g., an HD resolution). The media content delivery subsystem may be further configured to generate a single advertisement stream containing advertisement content having a third resolution (e.g., the SD resolution or any other suitable resolution). The advertisement content may be intended for presentation to a user of a media content access device (e.g., a set-top box device, a television, etc.) during an advertising break included in the media content.

In some examples, the media content delivery subsystem may be further configured to detect a transmission lag between the first and second program streams, dynamically synchronize the first and second program streams to substantially remove the detected transmission lag, and transmit the synchronized first program stream by way of a first content channel, the synchronized second program stream by way of a second content channel, and the advertisement stream by way of an advertisement channel. The media content delivery subsystem may then direct the media content access device to tune to the advertisement channel during the advertisement break in order to present the advertisement content to the user. For example, if the media content access device is initially tuned to the second content channel carrying HD media content, the media content delivery subsystem may be configured to direct the media content access device to switch to the advertisement channel and convert the advertisement content carried by the advertisement channel from an SD resolution to an HD resolution in order to present the advertisement content in HD to the user. Alternatively, if the media content access device is initially tuned to the first content channel carrying SD media content, the media content delivery subsystem may be configured to direct the media content access device to switch to the advertisement channel and abstain from converting the advertisement content to a different resolution in order to present the advertisement in SD to the user.

As described in more detail below, the methods and systems herein allow for a media content delivery subsystem to generate and/or maintain a single advertisement stream corresponding to multiple program streams carrying the same media content in different resolutions. In this manner, the media content delivery subsystem may avoid having to maintain multiple advertisement channels each carrying the same advertisement content in different resolutions so that media content access devices may present the same advertisement content to different users in different resolutions. In instances where it is desirable to concurrently present the same advertisement content in both SD and HD to different users, for example, the use of a single advertisement stream reduces the bandwidth requirements associated with the transmission of the advertisement content by substantially fifty percent. Such a reduction in required bandwidth may allow the media content delivery subsystem to provide an increased number of content channels (e.g., twice as many) and/or advertisement channels carrying different advertisement content than it otherwise could.

As used herein, the term "media content" may refer generally to any content made accessible by a media content delivery subsystem to a media content access subsystem. The term "media content instance" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

The term "media content stream" will be used herein to refer to any data stream comprising data representative of media content that may be presented to a user of a media content access subsystem. A media content stream may be streamed or otherwise provided over a network to the media content access subsystem in a manner that enables the media content access subsystem to begin presenting (e.g., displaying, playing back, recording for subsequent playback, etc.) a media content instance represented by the media content stream without having to first download the entire media content instance.

As will be described in more detail below, a media content stream may include a program stream, an advertisement stream, and/or any other type of media content stream as may serve a particular application. A "program stream" refers to a media content stream comprising data representative of one or more media content programs that may be presented to a user of a media content access subsystem. A "media content program" includes any media content instance, other than advertisements, that may be presented to a user. An "advertisement stream" refers to a media content stream containing data representative of advertisement content (e.g., one or more advertisements) that may be presented to a user of a media content access subsystem.

As used herein, a "standard definition" (or "SD") resolution refers to a 480i resolution. A "high definition" or ("HD") resolution refers to a resolution that is higher than an SD resolution (e.g., a 720p resolution, a 1080i resolution, and/or a 1080p resolution). Any other resolution may be considered standard definition or high definition as may serve a particular application.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive one or more media content streams containing data representative of media content (e.g., programs and/or advertisements) and/or data associated with media content (e.g., switching instructions, etc.) from delivery subsystem 102.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

Figure 2:
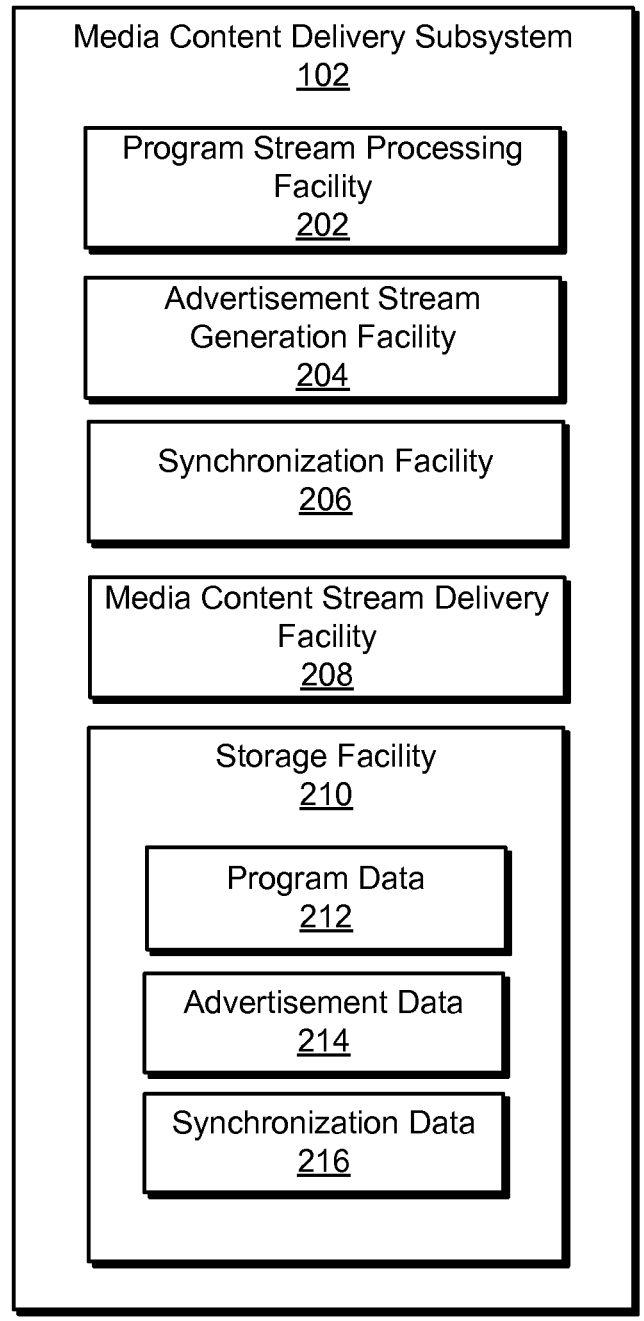
FIG. 2 illustrates exemplary components of a media content delivery subsystem according to principles described herein.

FIG. 2 illustrates exemplary components of delivery subsystem 102. As shown in FIG. 2, delivery subsystem 102 may include a program stream processing facility 202, an advertisement stream generation facility 204, a synchronization facility 206, a media content stream delivery facility 208, and a storage facility 210, which may be in communication with one another using any suitable communication technologies. It will be recognized that although facilities 202-210 are shown to be separate facilities in FIG. 2, any of those facilities may be combined into a single facility as may serve a particular application.

Program stream processing facility 202 (or simply "processing facility 202") may be configured to process program streams each comprising data representative of media content (e.g., one or more media content programs) that may be presented to one or more users of access subsystem 104. Processing facility 202 may be configured to process a program stream in any suitable manner as may serve a particular implementation. For example, processing facility 202 may receive, transmit, analyze, generate, convert, encode, decode, and/or otherwise process a program stream. Each program stream may be processed (e.g., generated) in accordance with any suitable format (e.g., a Moving Pictures Expert Group ("MPEG") format (e.g., "MPEG-2" or "MPEG-4").

Each program stream processed by processing facility 202 may have a particular resolution associated therewith. For example, processing facility 202 may be configured to process a first program stream representative of media content in a first resolution and a second program stream representative of the same media content in a second resolution. To illustrate, processing facility 202 may process program streams representative of the same media content (e.g., a television program) in both SD and HD. In this manner, the same media content may be presented to some users by way of an SD channel and to other uses by way of an HD channel. Processing facility 202 may additionally or alternatively process program streams representative of the same media content in different HD resolutions (e.g., 720p and 1080p) and/or in any other resolution as may serve a particular implementation. First and second program streams representative of the same media content in different resolutions will be referred to herein as "dual program streams." While dual program streams will be used in the examples described herein, it will be recognized that processing facility 202 may be configured to process any number of program streams each having any as may serve a particular implementation.

In some examples, a program stream processed by processing facility 202 may have a plurality of advertisement breaks included therein. One or more advertisements included in the program stream may be presented by access subsystem 104 to a user during one or more of the advertisement breaks. Additionally or alternatively, as will be described in more detail below, delivery subsystem 102 may be configured to direct access subsystem 104 to switch to being tuned to an advertisement stream during one or more of the advertisement breaks in order to present one or more targeted advertisements to a user.

In many instances, the processing performed by processing facility 202 may introduce a transmission lag between first and second program streams each representative of the same media content in different resolutions (e.g., SD and HD). The transmission lag may additionally or alternatively be introduced by different transmission paths taken by the first and second program streams and/or by any other factor as may serve a particular implementation. As used herein, a "transmission lag" between first and second program streams refers to an amount of time by which a transmission and/or delivery of the second program stream lags a transmission and/or delivery of the first program stream. For example, transmission of an HD program stream may lag behind its corresponding SD program stream by up to a few seconds. The transmission lag is often caused by additional processing that is performed by processing facility 202 on HD program streams compared to the processing performed by processing facility 202 on SD program streams. In some alternative examples, an SD stream may lag behind its corresponding HD program stream due to transmission path delays and/or any other factor. The exact duration of transmission lag may vary depending on the particular components used to implement processing facility 202 and/or one or more characteristics of the first and second program streams and may even change over time.

Advertisement stream generation facility 204 may be configured to generate one or more advertisement streams comprising data representative of advertisement content that may be presented to a user of access subsystem 104. In certain embodiments, the advertisement content may be targeted specifically for a particular user of access subsystem 104, as will be described in more detail below.

In instances where processing facility 202 processes dual program streams, advertisement stream generation facility 204 may be configured to generate a single advertisement stream containing advertisement content to be presented to viewers of both program streams. To this end, as will be described in more detail below, delivery subsystem 102 may direct access subsystem 104 to switch from either the first or second program stream to the single advertisement stream in order to present the one or more advertisements to a user of access subsystem 104. In some examples, the single advertisement stream may be included in a set of advertisement streams generated by advertisement stream generation facility 204. One of the advertisement streams within the set of advertisement streams may be selected as the single advertisement stream in accordance with a targeted advertisement selection heuristic. In this manner, different users may be presented with different advertisement content as may serve a particular implementation.

The advertisement content included within the single advertisement stream may have any suitable resolution. For example, the advertisement content may have the same resolution (e.g., an SD resolution) as the media content represented by the first program stream, the same resolution (e.g., an HD resolution) as the media content represented by the second program stream, or a resolution that is different than the resolutions of either of the first or second program streams. As will be described in more detail below, access subsystem 104 may be configured to convert the advertisement content to another resolution (e.g., an HD resolution) that substantially matches the resolution of media content being presented to a user of access subsystem 104 at the time access subsystem 104 receives an instruction to switch to the advertisement stream.

Synchronization facility 206 may be configured to detect the transmission lag between first and second program streams processed by processing facility 202. Synchronization facility 206 may be further configured to dynamically synchronize the first and second program streams to substantially remove the detected transmission lag. Such synchronization, as will be described in more detail below, may be configured to facilitate use of a single advertisement stream in association with dual program streams representative of the same media content in different resolutions.

Media content stream delivery facility 208 may be configured to transmit or otherwise deliver one or more media content streams (e.g., program streams and/or advertisement streams) to access subsystem 104 over network 106. In some examples, media content stream delivery facility 208 may be configured to broadcast, multicast, and/or narrowcast one or more media content streams. For example, media content stream delivery facility 208 may broadcast and/or multicast one or more television programs over network 106 in accordance with a television broadcast and/or multicast schedule. As another example, media content stream delivery facility 208 may narrowcast one or more television programs over network 106 in response to requests for the television programs.

In instances where first and second program streams have been synchronized by synchronization facility 206, media content stream delivery facility 208 may additionally be configured to transmit the synchronized first program stream by way of a first content channel and the synchronized second program stream by way of a second content channel. The single advertisement stream generated by advertisement stream generation facility 204 may be transmitted by media content stream delivery facility 208 by way of a single advertisement channel. Media content stream delivery facility 208 may be further configured to direct access subsystem 104 to switch from being tuned to either the first or second content channel to being tuned the advertisement channel during an advertising break in the first or second program stream. In this manner, advertisement content carried by the advertisement channel may be presented to viewers of either the first or second program stream.

In some examples, media content stream delivery facility 208 may be further configured to direct access subsystem 104 to convert the advertisement content included in the advertisement stream from one resolution to another. For example, if the advertisement is transmitted in an SD resolution and if access subsystem 104 is tuned to a content channel carrying HD media content, media content stream delivery facility 208 may direct access subsystem 104 to convert the advertisement content from the SD resolution to the HD resolution. In this manner, transition delays associated with switching from an HD content channel to an SD content channel may be avoided.

Storage facility 210 may be configured to maintain program data 212 representative of one or more media content programs, advertisement data 214 representative of one or more advertisements, and/or synchronization data 216 representative of data utilized by synchronization facility 206. It will be recognized that storage facility 210 may maintain additional or alternative data as may serve a particular implementation.

Figure 3:
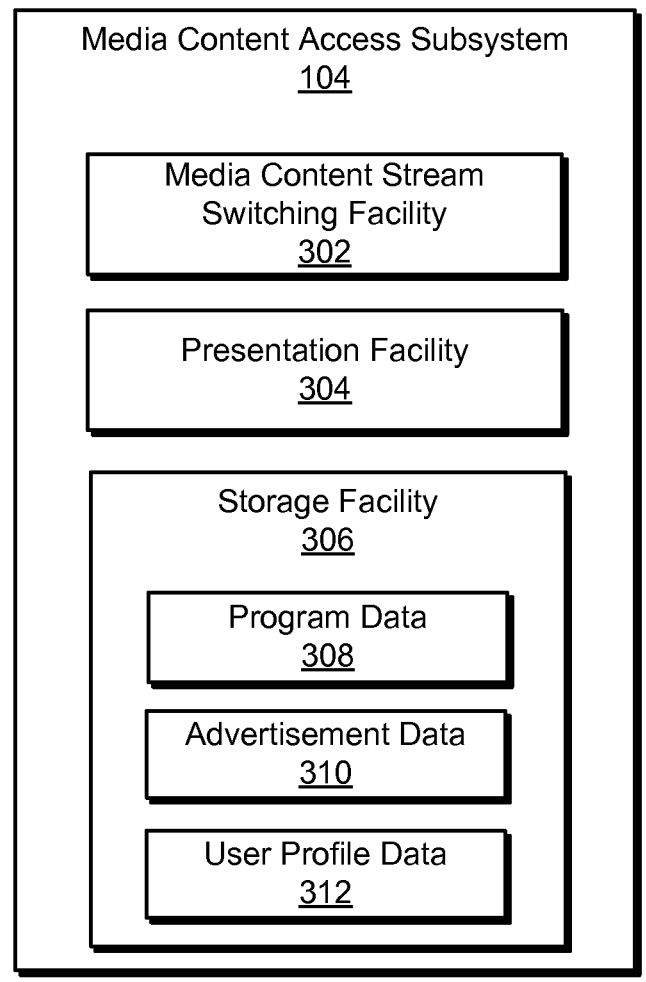
FIG. 3 illustrates exemplary components of a media content access subsystem according to principles described herein.

FIG. 3 illustrates exemplary components of access subsystem 104. As shown in FIG. 3, access subsystem 104 may include a media content stream switching facility 302, a presentation facility 304, and a storage facility 306, which may be in communication with one another using any suitable communication technologies. It will be recognized that although facilities 302-306 are shown to be separate facilities in FIG. 3, any of those facilities may be combined into a single facility as may serve a particular application.

Media content stream switching facility 302 may be configured to switch between various media content streams delivered to access subsystem 104 by delivery subsystem 102. As used herein, "switching" from a first media content stream to a second media content stream refers to any action performed by media content stream switching facility 302 that results in access subsystem 104 switching from being tuned to a content channel carrying the first media content stream to being tuned to a content channel carrying the second media content stream to the user. For example, media content stream switching facility 302 may direct access subsystem 104 to tune away from a content channel carrying a program stream to an advertisement channel carrying an advertisement stream or otherwise select the advertisement stream for presentation to a user of access subsystem 104.

In some examples, media content stream switching facility 302 may be configured to switch from a program stream to an advertisement stream in response to a switching instruction transmitted from delivery subsystem 102 to access subsystem 104. To illustrate, access subsystem 104 may be presenting a program represented by a program stream to a user when it receives a switching instruction from delivery subsystem 102. In response to the switching instruction, media content stream switching facility 302 may direct access subsystem 104 to switch to an advertisement stream to present one or more advertisements to the user. After the one or more advertisements have been presented, access subsystem 104 may switch back to the content channel carrying the program stream.

Presentation facility 304 may be configured to control a presentation of media content to a user of access subsystem 104. For example, presentation facility 304 may be configured to display or otherwise present one or more media content programs, one or more advertisements, and/or any other media content to a user. In some examples, presentation facility 304 may be configured to control the presentation of media content to a user of access subsystem 104 in accordance with a user profile associated with the user.

Storage facility 306 may be configured to maintain program data 308 representative of one or more media content programs, advertisement data 310 representative of one or more advertisements, and/or user profile data 312 representative of a user profile associated with a user of access subsystem 104. It will be recognized that storage facility 306 may maintain additional or alternative data as may serve a particular implementation.

Figure 4:
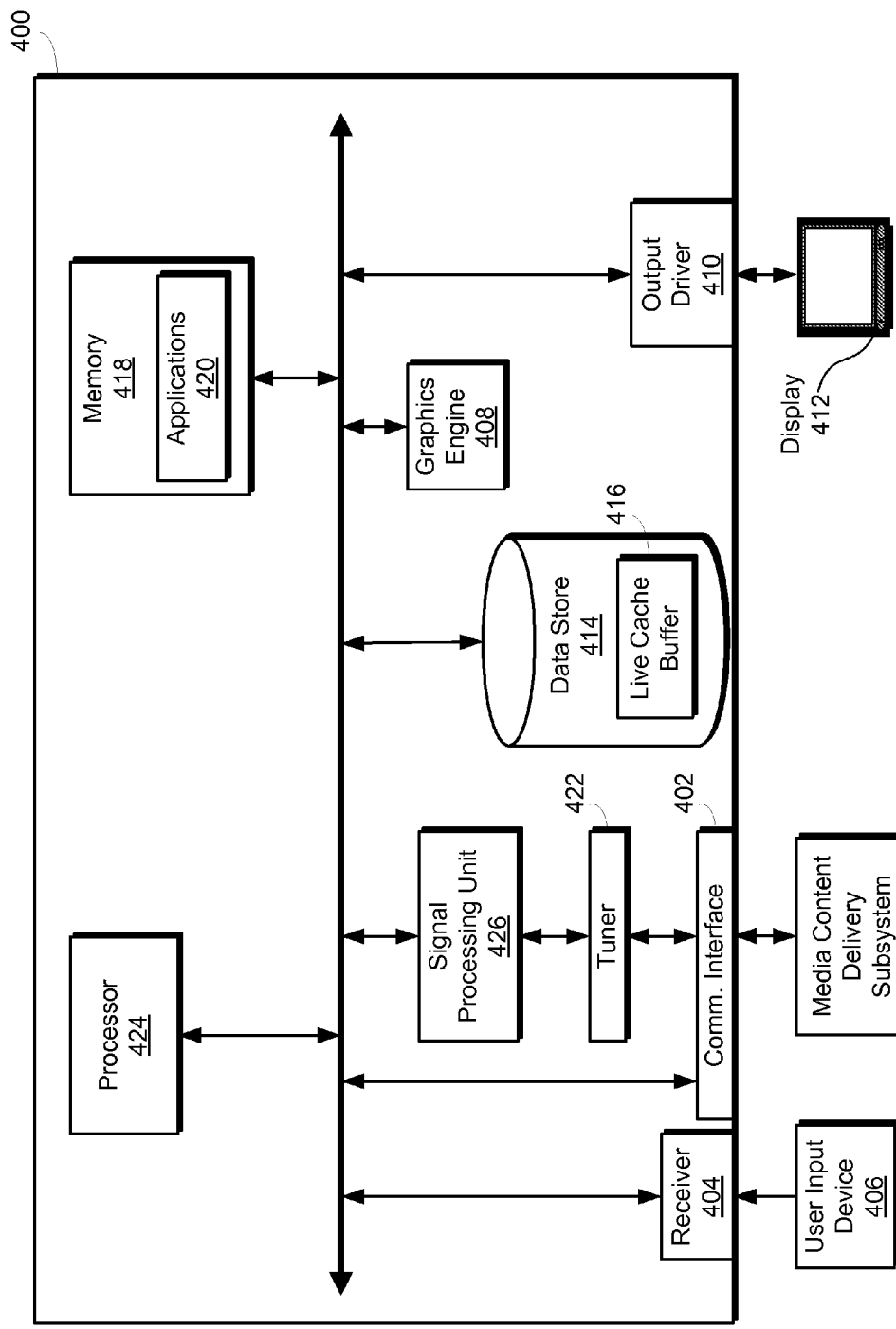
FIG. 4 illustrates an exemplary media content access device having the media content access subsystem of FIG. 3 implemented thereon according to principles described herein.

Access subsystem 104 and/or components of access subsystem 104 may be implemented as may suit a particular application. FIG. 4 illustrates an exemplary media content access device 400 (or simply "device 400") having access subsystem 104 implemented thereon. Device 400 may include one or more of the components of access subsystem 104 shown in FIG. 4 and may be configured to perform one or more of the processes and/or operations described herein. Device 400 may include, but is not limited to, a set-top box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 4, device 400 may include a communication interface 402 configured to receive media content (e.g., media content) and/or data (e.g., metadata, program guide data, and/or any other data associated with media content) in any acceptable format from delivery subsystem 102 or from any other suitable external source. Communication interface 402 may include any device, logic, and/or other technologies suitable for receiving signals and/or data representative of media content and/or other types of media content or data. Communication interface 402 may be configured to interface with any suitable communication media, protocols, and formats, including any of those mentioned above.

Device 400 may include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical media content (e.g., media content and/or program guide media content) generated by graphics engine 408 and to be presented by display 412 for experiencing by a user. For example, output driver 410 may provide data representative of a graphical user interface ("GUI") including a program guide view or a media playback view to display 412 for presentation to the user. Graphics engine 408 and output driver 410 may include any combination of hardware, software, and/or firmware as may serve a particular application.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416. Live cache buffer 416 may additionally or alternatively reside in memory 418 or in a storage device external to device 400. In some examples, media content data may be temporarily stored in live cache buffer 416 to facilitate recording of media content and/or presentation of media content in one or more trick play modes.

Device 400 may include memory 418. Memory 418 may include, but is not limited to, FLASH memory, random access memory ("RAM"), dynamic RAM ("DRAM"), other suitable computer-readable media, or any combination or subcombination thereof. In some examples, one or more applications 420 configured to run on or otherwise be executed by device 400 may reside in memory 418.

Device 400 may include one or more tuners 422. Tuner 422 may be configured to selectively receive media content carried on a particular media content carrier channel such that the media content may be processed by device 400. In some examples, media content received by tuner 422 may be temporarily buffered, or stored, in the live cache buffer 416. If there are multiple tuners 422, there may be a live cache buffer 416 corresponding to each of the tuners 422.

While tuner 422 may be used to receive certain media content-carrying signals transmitted by delivery subsystem 102, device 400 may be configured to receive other types of media content signals (including media content signals and/or program guide data signals) from delivery subsystem 102 and/or one or more other sources without using a tuner. For example, delivery subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., processor 424 or signal processing unit 426) without the signals going through tuner 422. For an IP-based signal, for example, signal processing unit 426 may function as an IP receiver.

Device 400 may include at least one processor, such as processor 424, configured to control and/or perform one or more operations of device 400. Device 400 may also include a signal processing unit 426 configured to process incoming media content. Signal processing unit 426 may be configured, for example, to demodulate and parse encoded digital media content. In some examples, device 400 may include one or more signal processing units 426 corresponding to each of the tuners 422.

Figure 5:
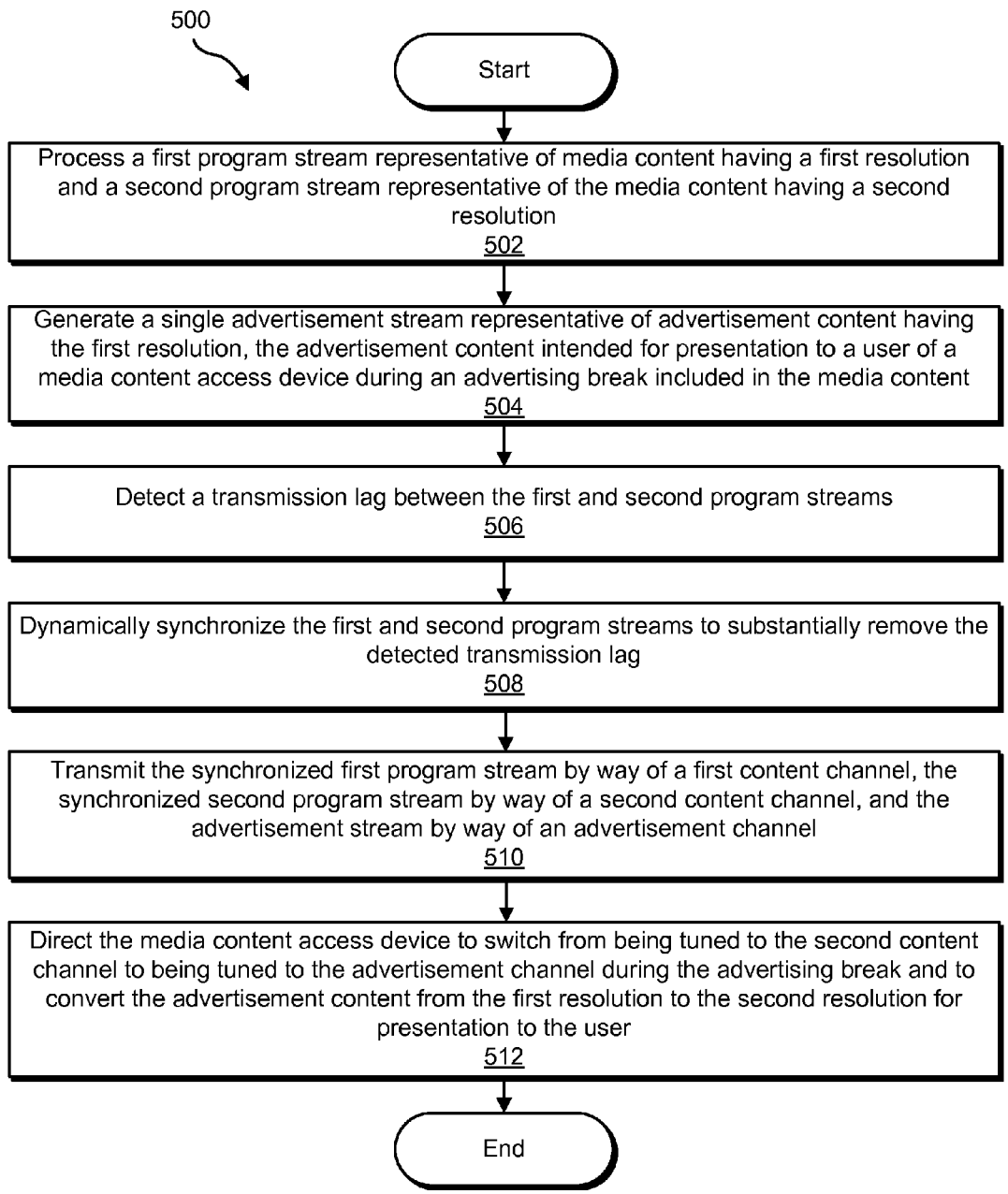
FIG. 5 illustrates an exemplary method of synchronizing delivery of media content streams having different resolutions according to principles described herein.

FIG. 5 illustrates an exemplary method 500 of synchronizing delivery of media content streams having different resolutions. While FIG. 5 illustrates exemplary steps according to one embodiment, other embodiments may omit, add to, reorder, and/or modify any of the steps shown in FIG. 5. The steps shown in FIG. 5 may be performed by any component or combination of components of delivery subsystem 102.

In step 502, a first program stream representative of media content having a first resolution and a second program stream representative of the same media content having a second resolution are processed. The first and second program streams may be processed in any of the ways described herein. For example, delivery subsystem 102 may receive, transmit, analyze, generate, convert, encode, decode, and/or otherwise process the first and second program streams.

Figure 6:
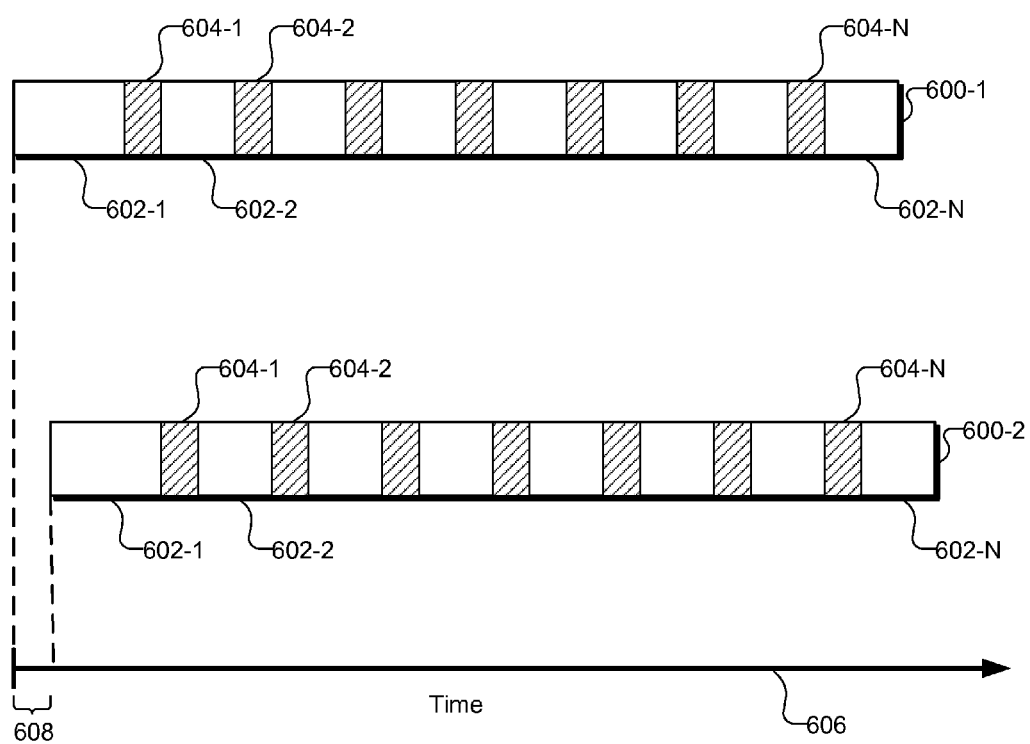
FIG. 6 illustrates an exemplary first program stream and an exemplary second program stream according to principles described herein.

FIG. 6 illustrates an exemplary first program stream 600-1 and an exemplary second program stream 600-2 that may be processed by delivery subsystem 102. First and second program streams 600-1 and 600-2 will be collectively referred to herein as "program streams 600."

As shown in FIG. 6, each program stream 600 may include program segments 602 (e.g., program segments 602-1 through 602-N) representative of a media content program and a plurality of advertising breaks 604 (e.g., advertising breaks 604-1 through 604-N) interspersed therein. Advertisement content may be presented to viewers of the media content program during advertisement breaks 604. Each advertisement break 604 may be of any suitable duration as may serve a particular implementation.

The advertisement content presented to viewers of the media content program during each advertisement break 604 may be included in program streams 600 and/or may be included in one or more separate advertisement streams. For example, non-targeted advertisements (e.g., national advertisements) intended for all viewers of the media content program represented by program stream 600 may be included directly in program streams 600. In this manner, access subsystem 104 does not have to tune to a different content channel during each advertisement break 604 in order to present the non-targeted advertisements to the viewers. Additionally or alternatively, one or more advertisement breaks 604 may be reserved for a service provider (e.g., a television subscription service provider) in order for the service provider to present one or more targeted advertisements intended for one or more particular viewers of the media content program. For example, as will be described in more detail below, advertisement break 604-2 may be reserved for a service provider to present a targeted advertisement to one or more viewers of the media content program.

As shown in FIG. 6, each program stream 600 may include the same program segments 602 and advertisement breaks 604. However, each program stream 600 has a different resolution associated therewith. For example, first program stream 600-1 may be representative of media content that has an SD resolution while second program stream 600-2 may be representative of media content that has an HD resolution.

Alternatively, first program stream 600-1 may be associated with a resolution that is greater than the resolution associated with second program stream 600-2. Because each program stream 600 is representative of media content having a distinct resolution, the processing performed by delivery subsystem 102 on program streams 600 may introduce a transmission lag between first program stream 600-1 and second program stream 600-2. To illustrate, FIG. 6 shows first and second program streams 600-1 and 600-2 positioned along a time axis 606. As shown in FIG. 6, second program stream 600-2 lags behind first program stream 600-1 by an amount of time represented herein by transmission lag 608. Transmission lag 608 may include any amount of time (e.g., up to a few seconds) and may vary depending on the particular components used to implement delivery subsystem 102 and/or one or more characteristics of program streams 600.

Figure 7:
FIG. 7 illustrates an exemplary advertisement stream according to principles described herein.

Returning to FIG. 5, in step 504, a single advertisement stream representative of advertisement content having the first resolution is generated. The advertisement content is intended for presentation to a user of a media content access device (e.g., access device 400) during an advertising break included in the media content represented by the first and second program streams processed in step 502. For example, FIG. 7 illustrates an exemplary advertisement stream 700 that may be generated by delivery subsystem 102. As shown in FIG. 7, advertisement stream 700 may include an advertisement segment 702 representative of advertisement content configured to be presented to a user during one of advertisement breaks 604 (e.g., advertisement break 604-2). Advertisement stream 700 may also include blank segments 704 (e.g., blank content 704-1 and 704-2) representative of blank content. Blank segments 704 correspond to time periods during which non-advertisement content (e.g. program segments 602) is presented to a user. Although a single advertisement segment 702 is shown in FIG. 7, it will be recognized that advertisement stream 700 may include any number of advertisement segments 702 as may serve a particular implementation.

As mentioned, the advertisement content included within advertisement stream 700 may have substantially same resolution as the media content represented by first program stream 600-1. For example, the media content represented by first program stream 600-1 and the advertisement content included within advertisement stream 700 may both have an SD resolution. The advertisement content included within advertisement stream 700 may alternatively have any other resolution (e.g., a third resolution), as will be described in more detail below.

In some examples, the advertisement content represented by advertisement segment 702 may be targeted specifically for a particular user of access device 400 and may be generated and/or otherwise maintained by a service provider (e.g., a subscription television service provider). In this manner, advertisers (e.g., local advertisers) may enter into an agreement with the service provider to present one or more targeted advertisements to one or more viewers of the media content program represented by program streams 600.

It will be recognized that delivery subsystem 102 may generate any number of advertisement streams representative of targeted advertisements intended for any number of users. For example, delivery subsystem 102 may generate, in addition to advertisement stream 700, another advertisement stream that is intended for one or more other users. Delivery subsystem 102 may determine which advertisement stream is intended for which user in accordance with any suitable heuristic as may serve a particular implementation.

Returning to FIG. 5, in step 506, a transmission lag between the first and second program streams is detected. For example, delivery subsystem 102 may be configured to detect transmission lag 608 associated with program streams 600-1 and 600-2. The transmission lag may be introduced by the processing performed in step 502 and/or by any other factor described herein. Delivery subsystem 102 may be configured to detect transmission lag 608 in any suitable manner as may serve a particular implementation.

For example, delivery subsystem 102 may be configured to identify a reference frame included in first program stream 600-1 and determine a reference timestamp associated with the reference frame. Delivery subsystem 102 may be further configured to identify a frame in second program stream 600-2 that is equivalent to the reference frame (i.e., representative of the same scene in the media content program represented by program streams 600) and determine a timestamp associated with that frame. Delivery subsystem 102 may then compare the timestamps in order to determine the transmission lag. For example, delivery subsystem 102 may compare the determined timestamps to determine that transmission lag 608 is three seconds (i.e., that the identified frame in second program stream 600-2 occurs three seconds after the reference frame in first program stream 600-1 occurs). Delivery subsystem 102 may be configured to automatically detect transmission lag 608 in this or any other manner (e.g., by detecting data included in either of program streams 600, such as one or more in-band messages, and comparing a relative temporal position of the detected data) as may serve a particular implementation.

Additionally or alternatively, delivery subsystem 102 may detect transmission lag 608 in response to manual input. For example, personnel associated with delivery subsystem 102 may view the media content represented by program streams 600-1 and 600-2 and visually detect transmission lag 608 between the two program streams 600. The personnel may input data representative of transmission lag 608 by way of a GUI and/or other interface. Delivery subsystem 102 may utilize the manual input to detect or determine transmission lag 608.

In step 508, the first and second program streams processed in step 502 are dynamically synchronized to substantially remove the transmission lag detected in step 508. Delivery subsystem 102 may be configured to dynamically synchronize the first and second program streams in any suitable manner as may serve a particular implementation. For example, delivery subsystem 102 may be configured to introduce a delay substantially equal to transmission lag 608 into a transmission of first program stream 600-1. The delay may be introduced by delivery subsystem 102 in any suitable manner as may serve a particular implementation. For example, delay subsystem 102 may pass first program stream 600-1 through a holding buffer configured to hold the first program stream 600-1 for a time period substantially equal to transmission lag 608 before allowing first program stream 600-1 to be transmitted. In this manner, the media content represented by first and second program streams 600-1 in 600-2 may be substantially aligned without one of the program streams (e.g., program stream 600-2) lagging behind the other program stream (e.g., program stream 600-1).

Figure 8:
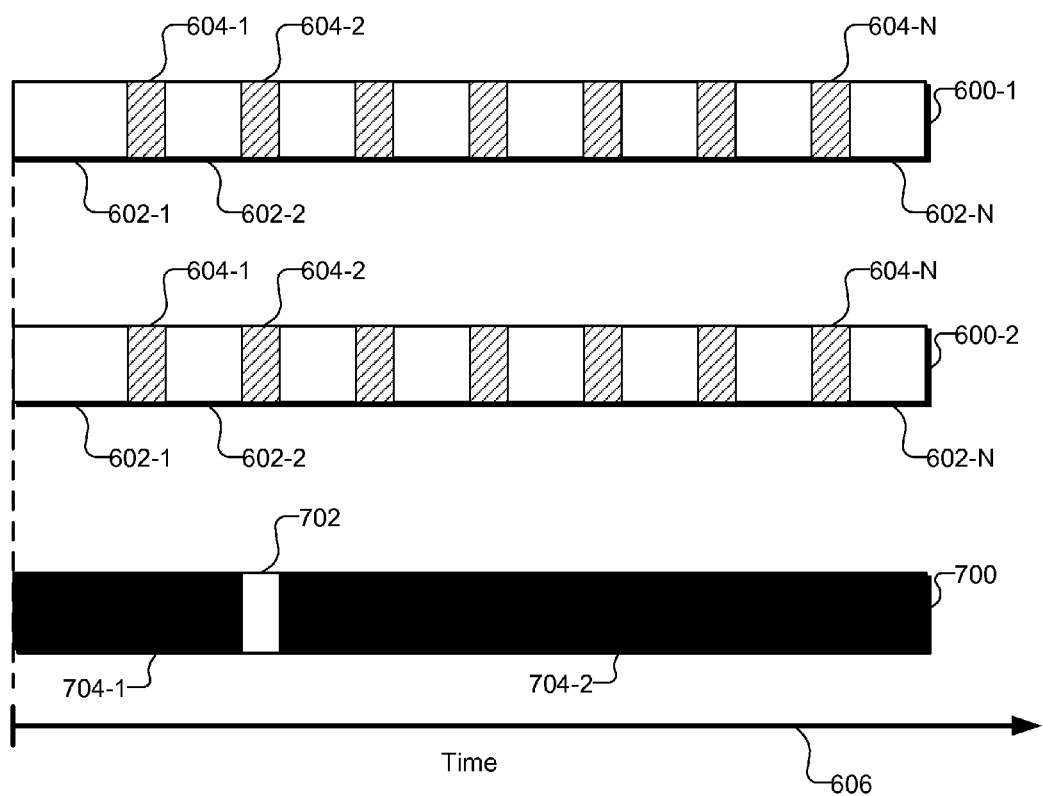
FIG. 8 shows an exemplary transmission of a first program stream, a second program stream, and an advertisement stream according to principles described herein.

In step 510, the synchronized first and second program streams are transmitted by way of first and second content channels, respectively, and the advertisement stream is transmitted by way of an advertisement channel. To illustrate, FIG. 8 shows an exemplary transmission of first program stream 600-1, second program stream 600-2, and advertisement stream 700. As shown in FIG. 8, first program stream 600-1, second program stream 600-2, and advertisement stream 700 may be transmitted at substantially the same time and in a substantially synchronized manner. Because first and second program streams 600-1 and 600-2 are transmitted at substantially the same time, a single advertisement stream (e.g., advertisement stream 700) may be used to provide advertisement content that is to be presented to viewers of the media content represented by program streams 600 during one or more advertisement breaks (e.g., during advertisement break 604-2).

Returning to FIG. 5, in step 512, a media content access device (e.g., a media content access device associated with the user for which the advertisement content represented by the advertisement stream generated in step 504 is intended) is directed to switch from being tuned to the second content channel to being tuned to the advertisement channel during the advertisement break. The media content access device is further directed to convert the advertisement content from the first resolution to the second resolution for presentation to the user.

To illustrate, access device 400 may be tuned to the second content channel (e.g., an HD content channel) carrying second program stream 600-2 when delivery subsystem 102 transmits data representative of a notification that advertisement break 604-2 will begin in a predetermined amount of time (e.g., a number of seconds). Upon receiving the notification, access device 400 may switch from being tuned to the second content channel to being tuned to the advertisement channel carrying advertisement stream 700 in order to present the advertisement content represented by advertisement segment 702 to a user of access device 400 during advertisement break 604-2. Because the advertisement content has a different resolution (e.g., an SD resolution) than the media content represented by second program stream 600-2, delivery subsystem 102 may direct access device 400 to convert the advertisement content to the resolution of the media content. For example, delivery subsystem 102 may direct access device 400 to convert the advertisement content from an SD resolution to an HD resolution. In this manner, access device 400 does not have to switch from presenting HD content to presenting SD content, thereby avoiding undesirable presentation delays associated with switching between content channels carrying different resolutions.

In some alternative examples, access device 400 may be tuned to the first content channel (e.g., an SD content channel) carrying first program stream 600-1 when delivery subsystem 102 transmits data representative of the notification that advertisement break 604-2 will begin in a predetermined amount of time (e.g., a number of seconds). Upon receiving the notification, access device 400 may switch from being tuned to the first content channel to being tuned to the advertisement channel carrying advertisement stream 700 in order to present the advertisement content represented by advertisement segment 702 to a user of access device 400 during advertisement break 604-2. Because the advertisement content has the same resolution as the media content represented by first program stream 600-1, delivery subsystem 102 does not have to direct access device 400 to convert the advertisement content to another resolution in order to present the advertisement.

Figure 9:
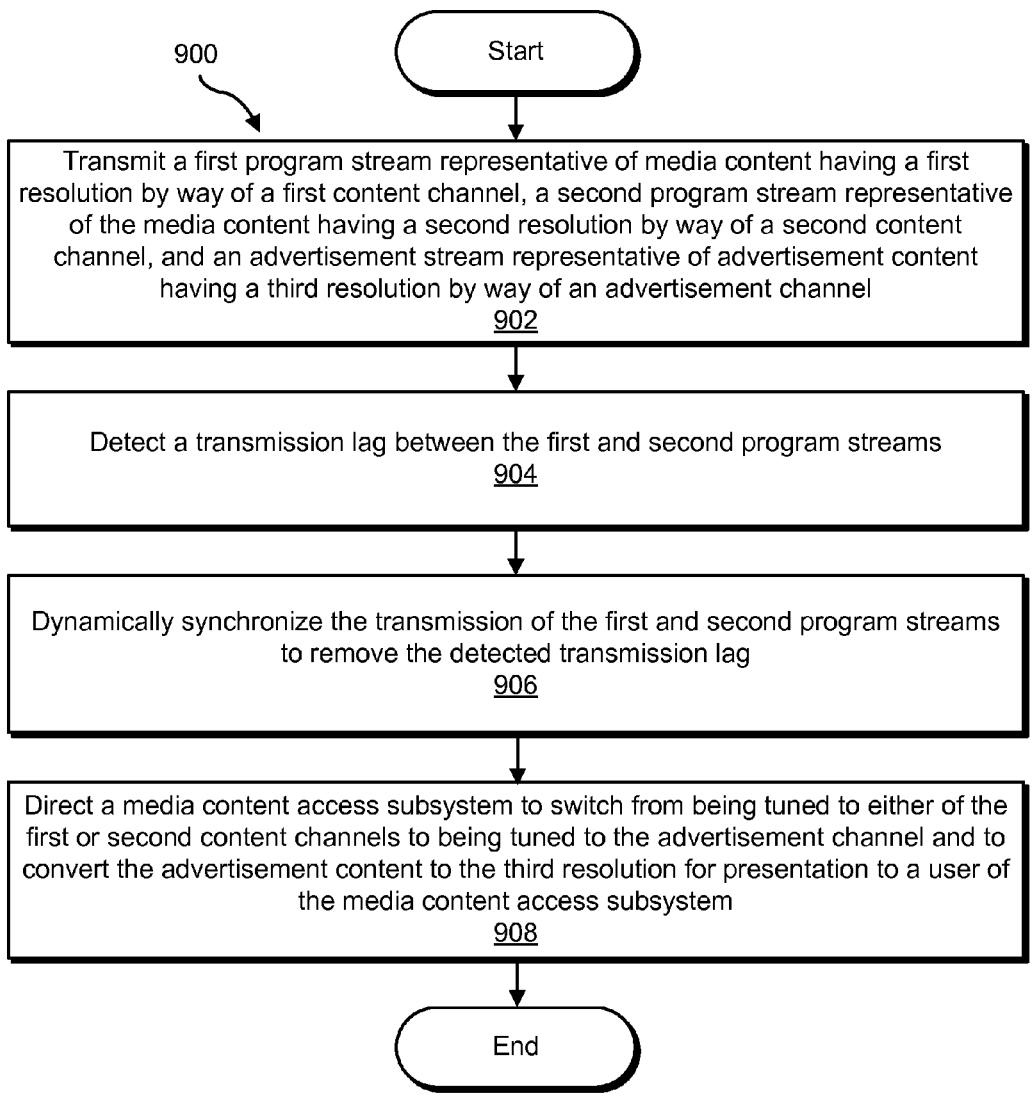
FIG. 9 illustrates another exemplary method of synchronizing delivery of media content streams having different resolutions according to principles described herein.

FIG. 9 illustrates an exemplary method 900 of synchronizing delivery of media content streams having different resolutions. While FIG. 9 illustrates exemplary steps according to one embodiment, other embodiments may omit, add to, reorder, and/or modify any of the steps shown in FIG. 9. The steps shown in FIG. 9 may be performed by any component or combination of components of delivery subsystem 102.

In step 902, a first program stream representative of media content having a first resolution is transmitted by way of a first content channel, a second program stream representative of the media content having a second resolution is transmitted by way of a second content channel, and an advertisement stream representative of advertisement content having a third resolution is transmitted by way of an advertisement channel. In some examples, the third resolution may be different than the first and second resolutions. Alternatively, the third resolution may be substantially the same as one of the first or second resolutions. Delivery subsystem 102 may transmit the first and second program streams and the advertisement stream in any of the ways described herein.

In step 904, a transmission lag between the first and second program streams is detected. The transmission lag may be detected by delivery subsystem 102 in any of the ways described herein.

In step 906, the transmission of the first and second program streams is dynamically synchronized to remove the detected transmission lag. Delivery subsystem 102 may dynamically synchronize the transmission of the first and second program streams in any of the ways described herein.

In step 908, a media content access subsystem is directed to switch from being tuned to the second content channel to being tuned to the advertisement channel and to convert the advertisement content to the third resolution for presentation to a user of the media content access subsystem. Step 908 may be performed in any of the ways described herein.

Figure 10:
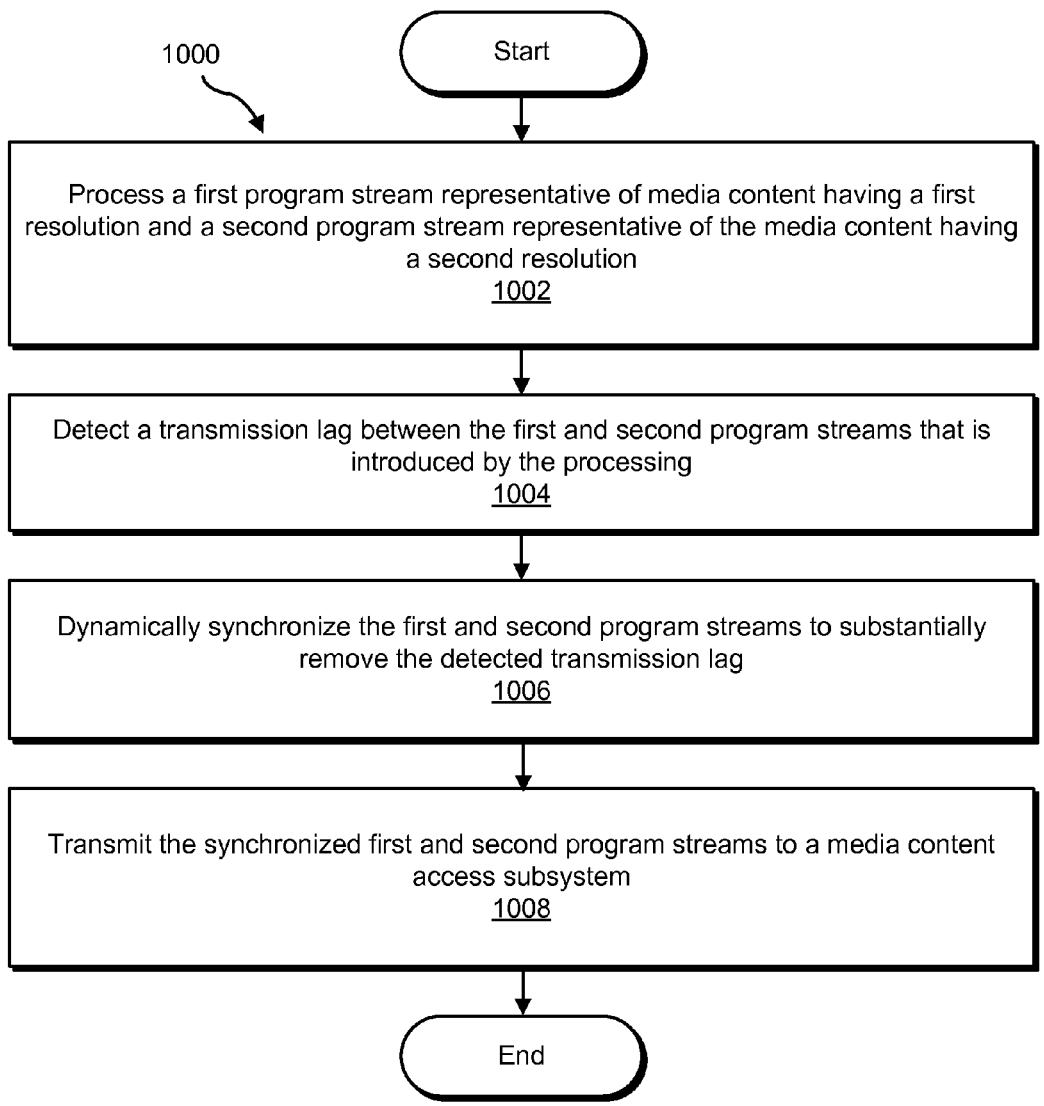
FIG. 10 illustrates another exemplary method of synchronizing delivery of media content streams having different resolutions according to principles described herein.

FIG. 10 illustrates an exemplary method 1000 of synchronizing delivery of media content streams having different resolutions. While FIG. 10 illustrates exemplary steps according to one embodiment, other embodiments may omit, add to, reorder, and/or modify any of the steps shown in FIG. 10. The steps shown in FIG. 10 may be performed by any component or combination of components of delivery subsystem 102.

In step 1002, a first program stream representative of media content having a first resolution and a second program stream representative of the media content having a second resolution are processed. Delivery subsystem 102 may perform step 1002 in any of the ways described herein.

In step 1004, a transmission lag between the first and second program streams that is introduced by the processing is detected. Delivery subsystem 102 may perform step 1004 in any of the ways described herein.

In step 1006, the first and second program streams are dynamically synchronized to substantially remove the detected transmission lag. Delivery subsystem 102 may perform step 1006 in any of the ways described herein.

In step 1008, the synchronized first and second program streams are transmitted to a media content access subsystem. Delivery subsystem 102 may perform step 1008 in any of the ways described herein.

Figure 11:
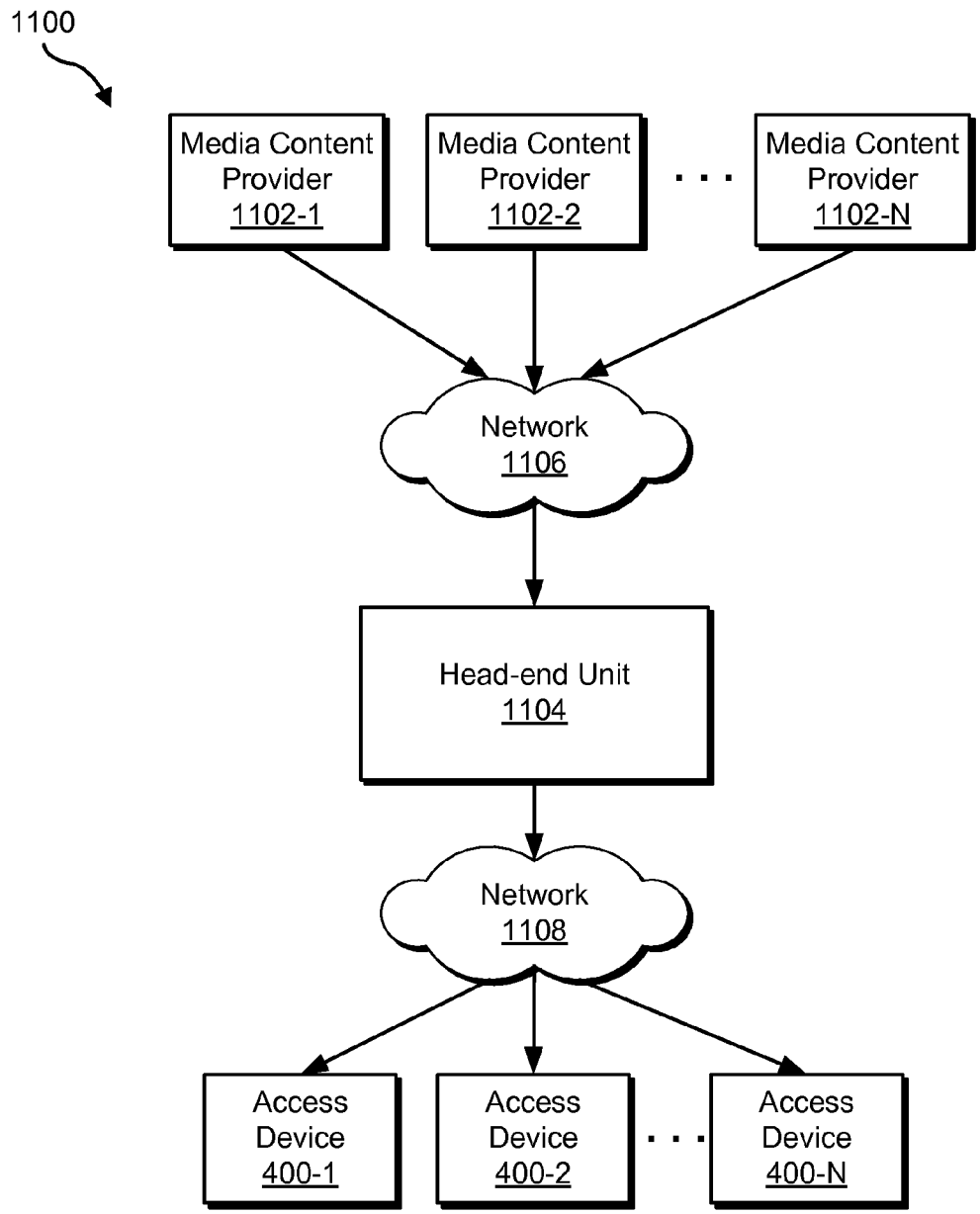
FIG. 11 illustrates an exemplary implementation of the system of FIG. 1 according to principles described herein.

A specific implementation of the systems and methods described herein will now be described in connection with FIG. 11. FIG. 11 illustrates an exemplary configuration 1100 wherein delivery subsystem 102 comprises a plurality of media content providers 1102-1 through 1102-N (collectively referred to herein as "media content providers 1102") configured to communicate with a head-end unit 1104 via a network 1106. Head-end unit 1104 may be owned, operated, or otherwise associated with a service provider (e.g., a subscriber television service provider) and may be configured to communicate with a plurality of access devices 400-1 through 400-N (collectively referred to herein as "access devices 400") via a network 1108. Networks 1106 and 1108 may include any of the networks described herein. In some examples, networks 1106 and 1108 comprise a single network.

In some examples, media content providers 1102 may each include one or more components configured to provide one or more program streams (e.g., program streams 600) to head-end unit 1104 via network 1106. In some alternative examples, one or more of the media content providers 1102 may be configured to provide one or more program streams directly to head-end unit 1104 without transmitting data via network 1106.

Head-end unit 1104 may include one or more components configured to acquire media content from media content providers 1102 and distribute the media content to access devices 400 via network 1108. An exemplary head-end unit 1104 may include a video head-end and/or a video hub office configured to acquire and distribute national, regional, and/or local broadcast and video-on-demand media content to access devices 400. In some examples, head-end unit 1104 may be configured to generate and/or provide one or more advertisement streams (e.g., advertisement stream 700) to access devices 400. In some examples, the advertisement streams generated and/or provided by head-end unit 1104 may include data representative of targeted advertisements intended for one or more specific users of access devices 400.

Head-end unit 1104 may be configured to perform one or more functions associated with synchronization facility 206 and/or media content stream delivery facility 208. For example, head-end unit 1104 may be configured to detect a transmission lag between first and second program streams 600-1 and 600-2, dynamically synchronize the first and second program streams to substantially remove the detected transmission lag, transmit or otherwise deliver program streams 600 and advertisement stream 700 to one or more of access devices 400, and direct one or more of access devices 400 to switch from being tuned to either of program streams 600 to being tuned to advertisement stream 700 during one or more advertisement breaks 604.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a computer-readable medium, or combinations of tangibly embodied computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
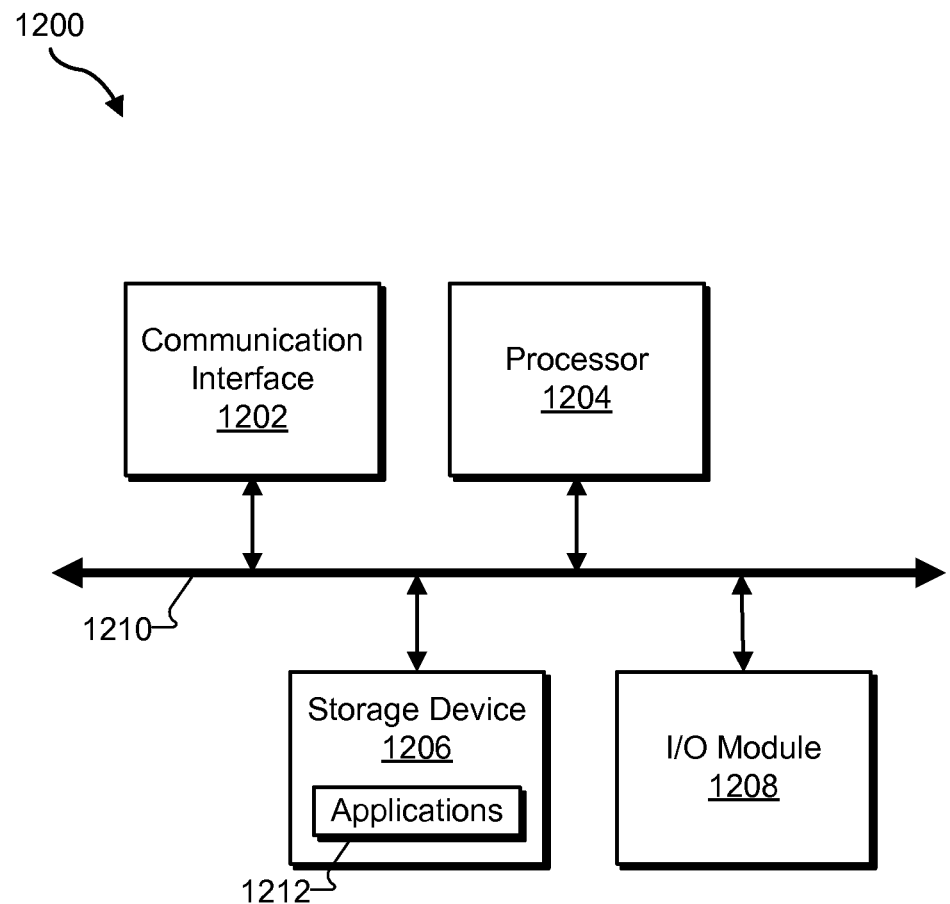
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. Communication interface 1202 may additionally or alternatively provide such a connection through, for example, a local area network (such as an Ethernet network), a personal area network, a telephone or cable network, a satellite data connection, a dedicated URL, or any other suitable connection. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with program stream processing facility 202, advertisement stream generation facility 204, synchronization facility 206, media content stream delivery facility 208, media content stream switching facility 302, and/or presentation facility 304. Likewise, storage facility 210 and/or storage facility 306 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    processing, by a media content delivery subsystem, a first program stream representative of media content having a first resolution and a second program stream representative of the media content having a second resolution;
    generating, by the media content delivery subsystem, a single advertisement stream containing advertisement content having the first resolution, the advertisement content intended for presentation to a user of a media content access device during an advertising break included in the media content;
    automatically detecting, by the media content delivery subsystem, a transmission lag between the first and second program streams by detecting an in-band message included in the first program stream and an in-band message in the second program stream and comparing a relative temporal position of the detected in-band messages;
    dynamically synchronizing, by the media content delivery subsystem, the first and second program streams to substantially remove the detected transmission lag;
    transmitting, by the media content delivery subsystem, the synchronized first program stream by way of a first content channel, the synchronized second program stream by way of a second content channel, and the single advertisement stream by way of a television-based advertisement channel; and
    directing, by the media content delivery subsystem, the media content access device to switch from being tuned to the first content channel or the second content channel to being tuned to the television-based advertisement channel during the advertising break and to convert the advertisement content from the first resolution to the second resolution.

2. The method of claim 1, further comprising:
    generating, by the media content delivery subsystem, another single advertisement stream containing additional advertisement content having the first resolution, the additional advertisement content intended for presentation to another user of another media content access device during the advertising break included in the media content;
    transmitting, by the media content delivery subsystem, the another advertisement stream by way of another television-based advertisement channel; and
    directing, by the media content delivery subsystem, the another media content access device to switch from being tuned to the second content channel to being tuned to the another television-based advertisement channel during the advertising break and to convert the additional advertisement content from the first resolution to the second resolution.

3. The method of claim 1, wherein the detecting of the transmission lag further comprises:
    identifying a reference frame in the first program stream;
    determining a reference timestamp of the reference frame;
    identifying a frame in the second program stream that is equivalent to the reference frame;
    determining a timestamp of the frame in the second program stream; and comparing the timestamp with the reference timestamp.

4. The method of claim 1, wherein the detecting of the transmission lag further comprises detecting the transmission lag in response to manual input.

5. The method of claim 1, wherein the dynamically synchronizing comprises introducing a delay substantially equal to the transmission lag into the transmission of the first program stream.

6. The method of claim 1, wherein the first resolution comprises a standard definition ("SD") resolution and the second resolution comprises a high definition ("HD") resolution.

7. The method of claim 1, wherein the second resolution is higher than the first resolution.

8. The method of claim 1, wherein the second resolution is lower than the first resolution.

9. The method of claim 1, embodied as computer-executable instructions on at least one non-transitory computer-readable medium.

10. A method comprising:
    transmitting, by a media content delivery subsystem, a first program stream representative of media content having a first resolution by way of a first content channel, a second program stream representative of the media content having a second resolution by way of a second content channel, and an advertisement stream containing advertisement content having a third resolution by way of a television-based advertisement channel;
    automatically detecting, by the media content delivery subsystem, a transmission lag between the first and second program streams by detecting an in-band message included in the first program stream and an in-band message in the second program stream and comparing a relative temporal position of the detected in-band messages;

dynamically synchronizing, by the media content delivery subsystem, the transmission of the first and second program streams to remove the detected transmission lag; and directing, by the media content delivery subsystem, a media content access subsystem to switch from being tuned to the synchronized first content channel or the second content channel to being tuned to the television-based advertisement channel and to convert the advertisement content to the third resolution.

11. The method of claim 10, further comprising directing, by the media content delivery subsystem, another media content access subsystem to switch from being tuned to the first content channel to being tuned to the television-based advertisement channel during the advertising break.

12. The method of claim 10, wherein the detecting of the transmission lag further comprises:

identifying a reference frame in the first program stream;
determining a reference timestamp of the reference frame;
identifying a frame in the second program stream that is equivalent to the reference frame;
determining a timestamp of the frame in the second program stream; and comparing the timestamp with the reference timestamp.

13. The method of claim 10, wherein the detecting of the transmission lag further comprises detecting the transmission lag in response to manual input.

14. The method of claim 10, wherein the dynamically synchronizing comprises introducing a delay substantially equal to the transmission lag into the transmission of the first program stream.

15. The method of claim 10, wherein the first resolution comprises a standard definition ("SD") resolution and the second resolution comprises a high definition ("HD") resolution.

16. The method of claim 10, wherein the third resolution is substantially the same as the first resolution.

17. The method of claim 10, embodied as computer-executable instructions on at least one non-transitory computer-readable medium.

18. A method comprising:

processing, by a media content delivery subsystem, a first program stream representative of media content having a first resolution and a second program stream representative of the media content having a second resolution;
automatically detecting, by the media content delivery subsystem, a transmission lag between the first and second program streams that is introduced by the processing by detecting an in-band message included in the first program stream and an in-band message in the second program stream and comparing a relative temporal position of the detected in-band messages;
dynamically synchronizing, by the media content delivery subsystem, the first and second program streams to substantially remove the detected transmission lag;
transmitting, by the media content delivery subsystem to a media content access subsystem, the synchronized first program stream by way of a first content channel and the synchronized second program stream by way of a second content channel;
generating, by the media content delivery subsystem, a single advertisement stream containing advertisement content having the first resolution, the advertisement content intended for presentation to a user of a media content access device during an advertising break included in the media content; and
directing, by the media content delivery subsystem, the media content access device to switch from being tuned to the first content channel or the second content channel to being tuned to a television-based advertisement channel during the advertising break and to convert the advertisement content from the first resolution to the second resolution.

19. The method of claim 18, wherein the dynamically synchronizing comprises introducing a delay substantially equal to the transmission lag into the transmission of the first program stream.

20. A system comprising:

a program stream processing facility configured to process a first program stream representative of media content having a first resolution and a second program stream representative of the media content having a second resolution;
an advertisement stream generation facility configured to generate a single advertisement stream containing advertisement content having the first resolution, the advertisement content intended for presentation to a user of a media content access device during an advertising break included in the media content;
a synchronization facility communicatively coupled to the program stream processing facility and configured to automatically detect a transmission lag between the first and second program streams by detecting an in-band message included in the first program stream and an in-band message in the second program stream and comparing a relative temporal position of the detected in-band messages and to dynamically synchronize the first and second program streams to substantially remove the detected transmission lag; and
a media content stream delivery facility communicatively coupled to the advertisement stream generation facility and the synchronization facility and configured to transmit the synchronized first program stream by way of a first content channel, the synchronized second program stream by way of a second content channel, and the advertisement stream by way of a single television-based advertisement channel, and
direct the media content access subsystem to switch from being tuned to the first content channel or the second content channel to being tuned to the television-based advertisement channel during the advertising break and to convert the advertisement content from the first resolution to the second resolution.

21. The system of claim 20, wherein the synchronization facility is configured to dynamically synchronize the first and second program streams by introducing a delay substantially equal to the transmission lag into the transmission of the first program stream.

* * * * *